June 7, 1960 J. A. INGHAM 2,939,914
SYSTEM FOR PRODUCING A TIMING SIGNAL FOR USE IN A BINARY CODE RECEIVER
Filed March 6, 1956 3 Sheets-Sheet 1

INVENTOR.
JOHN A. INGHAM
BY
[signature]
ATTORNEY

June 7, 1960 J. A. INGHAM 2,939,914

SYSTEM FOR PRODUCING A TIMING SIGNAL FOR USE IN A BINARY CODE RECEIVER

Filed March 6, 1956 3 Sheets-Sheet 2

INVENTOR.
JOHN A. INGHAM
BY
Deem V. Hendine
ATTORNEY

INVENTOR.
JOHN A. INGHAM
BY
[signature]
ATTORNEY 2,939,914

SYSTEM FOR PRODUCING A TIMING SIGNAL FOR USE IN A BINARY CODE RECEIVER

John A. Ingham, Arlington, Va., assignor to Philco Corporation, Philadelphia, Pa., a corporation of Pennsylvania Filed Mar. 6, 1956, Ser. No. 569,767

16 Claims. (Cl. 178—67)

This invention relates to binary code signal receivers, and more particularly, to the production of a timing signal in such a receiver to make possible recovery of the original binary signal.

In any system for the transmission and reception of binary digital information, the binary pulse signal containing the information is transformed into a two-level binary signal in which one level represents the presence of pulses and the other level represents the absence of pulses. The rate of occurrence of binary digits is known as the baud or bit rate. Each digit is represented by a pulse or an absence of a pulse in the original binary signal, and by the corresponding portion of the two-level signal.

While it is possible to transmit the two-level signal, such a signal is not well suited for space transmission. While suitable in some respects, it does not meet all of the requirements for optimum space transmission on a modulated high frequency carrier. A more advantageous method generally employed in the past is the so-called dipulse method of transmission. In the dipulse system, one cycle of sine wave is produced for each high level portion of the two-level signal corresponding to a binary digit, and no signal is produced for the low level portions of the two-level signal. The resulting signal is then transmitted, usually as amplitude modulation of a high frequency carrier, and is employed at the receiver, after demodulation, to reproduce or recover the two-level binary signal. While the dipulse system is better adapted to space transmission, a serious objection of the system is its susceptibility to the effects of noise.

In a copending application of J. T. Warnock, Serial No. 568,421, filed February 23, 1956, assigned to the assignee of the present application; an improved system is disclosed which overcomes the objections of the dipulse system and which will operate with one-half the signal-to-noise ratio required for the dipulse system. In the Warnock system, the transmission of binary digital information is effected by means of a biphase signal having components of differing (e.g., opposite) phase representative respectively of the two different binary digits. At the transmitting station, the aforementioned two-level binary signal is utilized to produce the biphase signal which is then transmitted to the receiving station, preferably as amplitude modulation of a high frequency carrier. At the receiving station, the biphase signal is utilized to reproduce or recover the two-level binary signal. As described in the Warnock application, this may be accomplished by producing at the receiver a timing signal fixedly related in frequency and phase to the biphase signal.

One object of the present invention is to provide a system for the production at the receiver of a timing signal for the reproduction or recovery of the two-level binary signal from the biphase signal.

Another object of this invention is to provide such a system which is simple and yet highly efficient, and which insures proper and accurate decoding of the biphase intelligence signal.

This invention contemplates that a synchronizing signal shall be transmitted for a time interval immediately preceding the transmission of the biphase intelligence signal. By this invention there is initiated, in response to the preliminary synchronizing signal, a timing signal which continues throughout the duration of the biphase signal, and which has a frequency corresponding to the baud rate employed and has a phase corresponding to and identified with one phase of the biphase signal.

The invention may be clearly understood from the following detailed description.

Reference is now made to the accompany drawings, wherein

Figure 3:
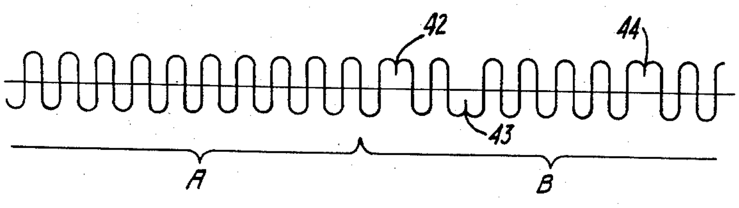
Figs. 3 to 9 show signal waveforms which appear at various points in the system.

As indicated above, this invention is applicable to a system in which a synchronizing signal is transmitted for a time interval immediately preceding the complete and uninterrupted transmission of the intelligence signal containing the binary code message. Fig. 3 illustrates the signals after detection at the receiver. The signals are generally of the form shown due to bandwidth restrictions of the transmitter and the receiver. Thus, in Fig. 3, there is shown an alternating wave synchronizing signal A having a frequency corresponding to the baud rate of the binary code, which rate may be assumed for the present purpose to be 25-kc., and there is also shown a biphase intelligence signal B immediately following the synchronizing signal. The signal B may comprise alternating wave components of opposite phase representative of the two binary digits 0 and 1. This signal, having been produced from a two-level binary signal as described in the aforementioned Warnock application, contains the binary digital information. Thus each cycle of the biphase signal represents a binary digit, and each change of phase represents a change of level of the original two-level binary signal.

The reason for transmission of the synchronizing signal A is that the biphase signal B cannot be decoded without the use of an auxiliary timing signal, and furthermore the latter signal cannot be derived from the biphase signal itself because of the changing phase characteristic thereof.

Figure 1:
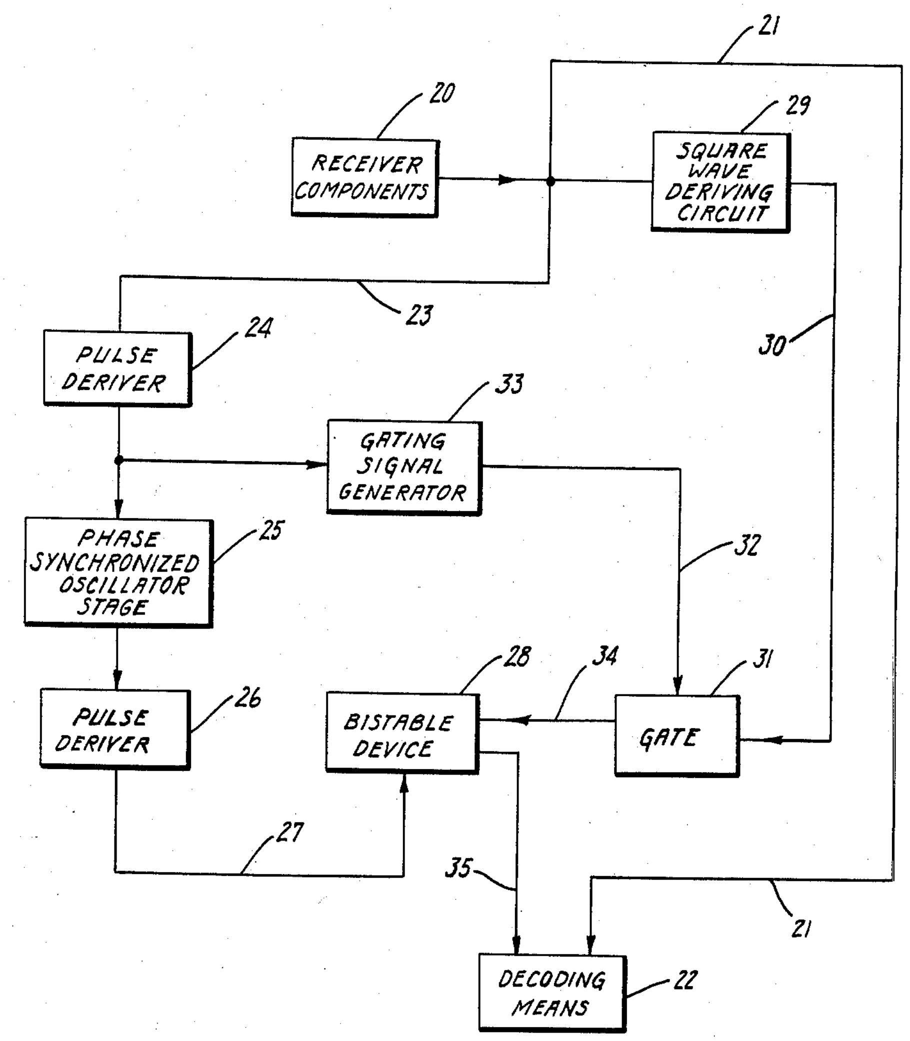
Fig. 1 is a block diagram of a preferred embodiment of a system according to this invention.

Referring to the block diagram of Fig. 1, block 20 represents the receiver components by which the entire transmitted signal of Fig. 3 is detected and amplified in usual manner, and from which the biphase intelligence signal is supplied over connection means 21 to the decoding means 22. In accordance with this invention, there is initiated in response to the synchronizing signal A of Fig. 3 a timing signal which is supplied to the decoding means 22. This signal, while delayed with respect to signal A, has a frequency representative of the baud rate of the binary intelligence and a phase which is identified with one of the phases of the biphase intelligence signal. The preferred system for producing the timing signal will now be described.

Figure 4:
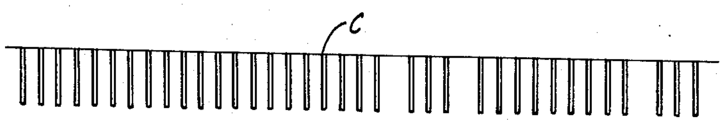

The signal output from block 20 is supplied over connection means 23 to a pulse deriver 24 which produces by differentiation the pulse signal C of Fig. 4 having a frequency (e.g. 50-kc.) equal to twice the baud rate. This signal is not useful in itself for the production of a continuous timing signal because it may contain noise components and furthermore some pulses are missing due tc the character of the biphase intelligence signal B. In order to provide a satisfactory continuous signal, the pulse signal C from the pulse deriver 24 is supplied to a phase synchronized oscillator stage 25. The latter is locked in phase by the pulse signal C, and it produces a continuous sine wave signal (not shown) which is supplied to the pulse deriver 26 to produce by wave squaring and by differentiation the pulse signal D of Fig. 5. Thus, the synchronized oscillator stage 25 and the pulse deriver 26 effectively provide a pulse signal D corresponding to signal C, in which, however, all of the pulses are present. For convenience, the pulse signal D may be referred to as the frequency-synchronizing signal. This signal is supplied over connection means 27 to a bistable circuit 28 which may be an Eccles-Jordan circuit.

Figure 6:
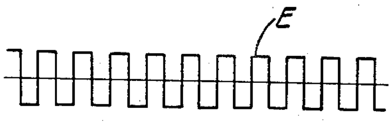

The signal output from block 20 is also supplied to a square wave deriving circuit 29 which produces the signal E of Fig. 6. This signal is supplied over connection means 30 to a gate 31. The latter is normally closed and is opened only for the duration of the gate-opening signal F of Fig. 7 which is supplied to the gate over connection means 32 from generator 33. This gating signal generator is supplied from the pulse deriver 24, and it produces the gate-opening signal F in response to a portion of signal C corresponding to a portion of the synchronizing signal A. During the occurrence of the gate-opening signal F, the gate 31 supplies the signal G of Fig. 8 to the bistable circuit 28 over connection means 34. This signal, which is produced directly from the synchronizing signal A, may be referred to as the phase-synchronizing signal.

Figure 5:
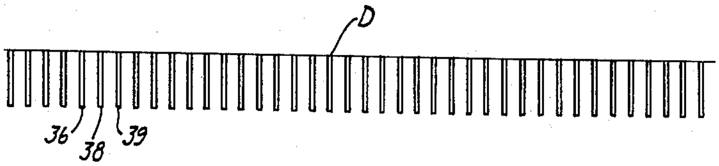
Figure 8:
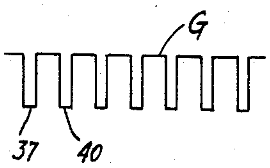

Thus, the bistable circuit 28 has supplied to it the frequency-synchronizing signal D of Fig. 5 and the phase-synchronizing signal G of Fig. 8. In response to these signals, the bistable circuit 28 initiates the timing signal H of Fig. 9 which has a constant frequency representative of the baud rate of the binary intelligence and which has an established phase identified with one of the phases of the biphase intelligence signal. After establishment of the phase of signal H, the phase-synchronizing signal G of Fig. 8 is cut off, and the bistable circuit 28 is driven by the phase synchronized oscillator stage 25 to produce the continuous timing signal H for the entire duration of the biphase intelligence signal B. A pulse signal may be derived from signal H by differentiation, for use in the manner described in the aforementioned Warnock application.

Considering more particularly the initiation of the timing signal H by the bistable circuit 28, it will be realized that the phase synchronized oscillator stage 25, once it is locked in phase by the pulse signal C from pulse deriver 24, supplies a signal whose frequency is constant and represents the baud rate of the binary intelligence, but whose phase may not bear the proper relation to the phases of the biphase intelligence signal. At the same time, the gate 31 supplies the signal G which, having been derived directly from the synchronizing signal A, does bear the proper phase relationship to the phases of the biphase intelligence signal. The bistable circuit 28 establishes the correct phase of the timing signal H according to signal G, and it then continues to be driven by the phase synchronized oscillator stage to produce the continuous timing signal. The manner in which the bistable device 28 establishes the proper phase in its output signal may be more clearly understood from the following explanation.

Figure 7:
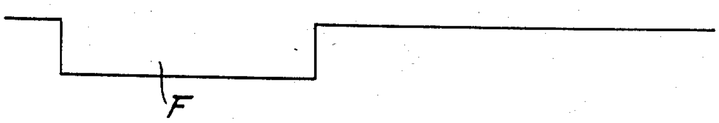

Assume that when the gate 31 is first opened by the gate-opening pulse F of Fig. 7, the bistable circuit 28 is in a first of its two stable states, corresponding to the low level of signal H. The first pulse 36 of Fig. 5 supplied from the pulse deriver 26 after the gate has been opened ordinarily would cause the bistable device to assume its second stable state. However, coincident with the pulse 36, there will be supplied to the bistable device 28 from the gate 31 a pulse 37 which will predominate and cause the bistable device to remain in its first stable state. The next pulse 38 from the deriver 26 will cause the bistable device to assume its second stable state, since there is no coincident pulse from the gate 31. The next pulse 39 from the pulse deriver 26 and the coincident pulse 40 from the gate 31 both will cause the bistable device to assume its first stable state. The phase of operation of the bistable device is now established in conformity with the phase of the synchronizing signal A and will be maintained as long as pulses are supplied from the pulse deriver 26.

Figure 9:
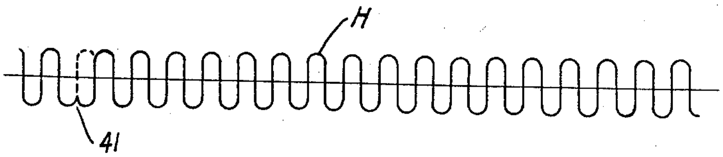

The above-described action of the bistable device 28 in establishing its phase of operation according to the phase-synchronizing signal from gate 31 is depicted in the left hand portion of Fig. 9. It is to be noted that the phase of the waveform of Fig. 9 shifts 180° at the point 41. This is because it was assumed that immediately prior to the opening of gate 31 the phase of operation of the bistable device 28 was 180° removed from its proper phase relationship with respect to the phase-synchronizing signal from the gate 31. Therefore, when the first pulse 37 from the gate was supplied to the bistable device, the phase of the operation of the latter was shifted to have the correct relation with the phase of the phase-synchronizing signal supplied from the gate.

It will be apparent from the foregoing discussion that if the phase of operation of the bistable device 28 were proper prior to the opening of gate 31, there would be no phase shift and the device would simply continue to be driven by the pulses from the pulse deriver 26.

The number of pulses supplied to the bistable device 28 from the gate 31 is, of course, determined by the duration of the gate-opening signal F of Fig. 7. The duration of this signal must be sufficiently long so that enough pulses are supplied to the bistable device from the gate to insure that the bistable device assumes the proper phase of operation. Normally this should be accomplished in one cycle of the synchronizing signal A, but more time is provided to insure the proper phasing of the bistable device. It should be noted, however, that the gate-opening signal F must terminate before the termination of the synchronizing signal A, as otherwise the biphase intelligence signal B might cause a change in phase of the timing signal H. To explain this, it will be noted that in the biphase signal B as shown, phase changes of 180° take place at points 42, 43 and 44. If the gate-opening signal F extended beyond the termination of the synchronizing signal A, a phase change in the biphase signal B, such as shown at 42, would cause a corresponding change in the time of occurrence of the output pulses from gate 31, with the result that the phase of operation of the bistable device 28 would be changed. Then the phase of the timing signal H would no longer bear the proper relationship to the phases of the biphase signal.

The generator 33, which produces the gate-opening signal F, is a known type of device which, in the presence of a triggering signal, will produce a timing pulse of fixed duration and will then terminate its operation and will not operate again until the triggering signal terminates and a new signal appears. As hereinafter described, the generator 33 may comprise a multivibrator of the one-shot type.

Figure 2:
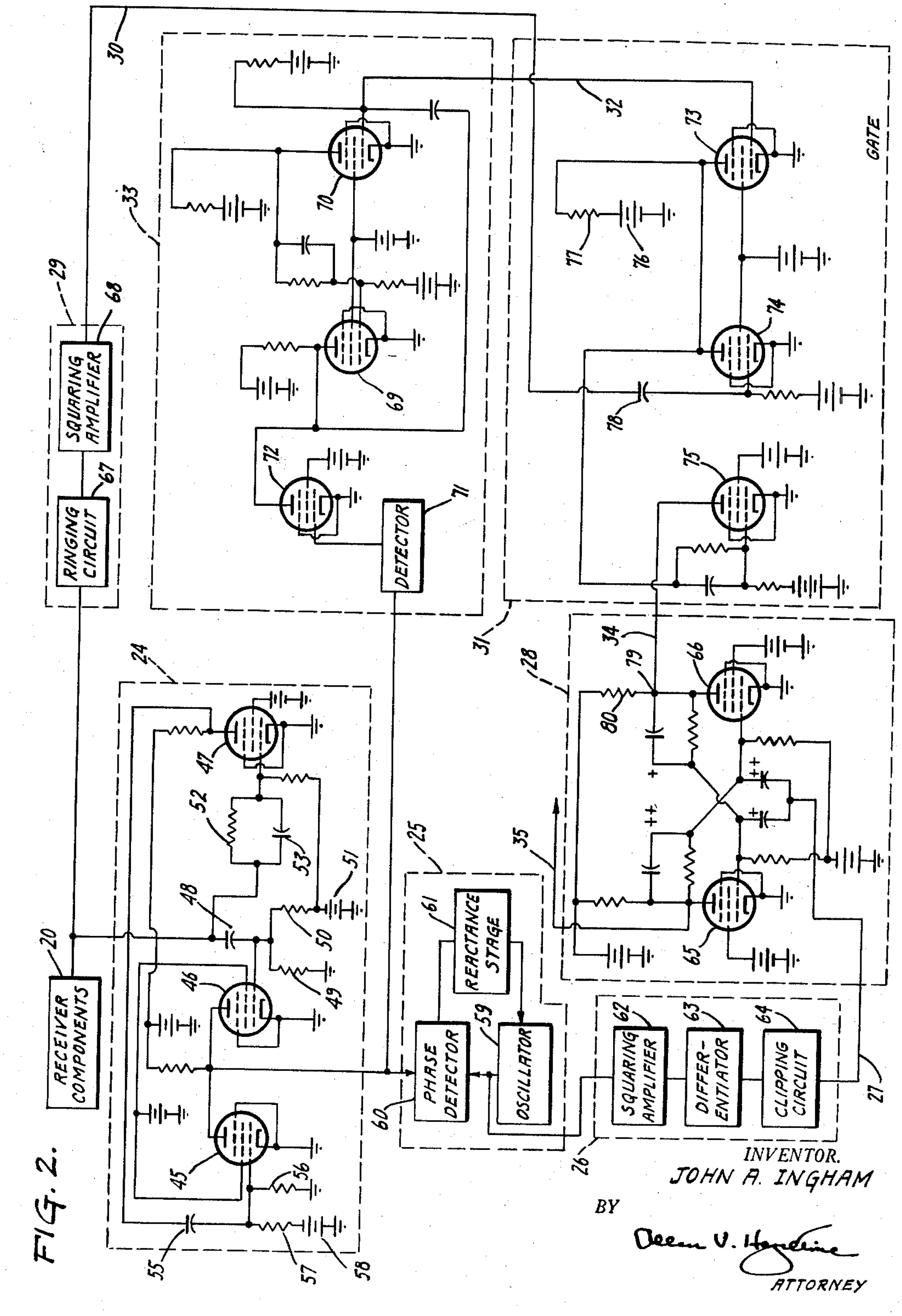
Fig. 2 is a more detailed illustration of the system, showing certain of the components in schematic form.

Referring now to Fig. 2, certain of the components of the system are shown in detail in order to assure a clear understanding of the system. The pulse deriver 24 comprises a pair of amplifier tubes 45 and 46, and in inverter tube 47. The signal from black 20 is supplied to the control grid of tube 46 through a differentiating circuit consisting of capacitor 48 and resistor 49. The control grid of tube 46 is biased by the biasing combination comprising resistors 49 and 50 and battery 51, so that tube 46 will produce output pulses only when the positive-going portions of the incoming signal are supplied to its control grid. Consequently, only negative pulses will appear at the plate of tube 46.

The signal from block 20 is also supplied to the control grid of the inverter tube 47 through a coupling circuit comprising resistor 52 and capacitor 53. The inverted signal, which is produced at the plate of tube 47, is supplied to the control grid of tube 45 through a differentiating circuit consisting of capacitor 55 and resistor 56. The control grid of tube 45 is biased by means of the combination comprising resistors 56 and 57 and battery 58, so that tube 45 will produce output pulses only in response to positive-going portions of the inverted signal, these portions corresponding to the negative-going portions of the signal as supplied from block 20.

The pulses thus produced at the plates of tubes 45 and 46 constitute the pulse signal C of Fig. 4 which, as previously described, is supplied to the phase-synchronized oscillator stage 25, and is also supplied to the gating signal generator 33.

The phase-synchronized oscillator 25 comprises an oscillator 59 having a frequency equal to twice the baud rate, which feeds into a phase detector 60 to which signal C is also supplied. The phase detector effectively compares the phase of the oscillator output with the phase of signal C, and it operates through the reactance stage 61 to lock the oscillator in phase with the signal C. The output of the phase-synchronized oscillator 59 is supplied to the pulse deriver 26. It will be seen that the phase-synchronized oscillator stage 25 comprises a well known arrangement for producing an output signal which is locked in phase with an input signal.

The pulse deriver 26 comprises a squaring amplifier 62, a differentiator 63, and a clipping circuit 64. Thus the pulse deriver 26 comprises a well known combination of components arranged in cascade to produce from a sine wave signal a pulse signal having the same frequency as the sine wave signal. In this instance, the pulse deriver 26 produces from the sine wave output of the synchronized oscillator 59 the pulse signal D which is supplied to the bistable device 28.

The bistable device 28 is a known form of Eccles-Jordan circuit as shown, comprising tubes 65 and 66 and the associated circuit components and connections. The signal D from the pulse deriver 26 is supplied to the control grids of tubes 65 and 66, while the signal E from gate 31 is supplied over conductor 34 to the grid of tube 65 and the plate of tube 66. As well understood by those skilled in the art, the successive pulses supplied to the control grids of tubes 65 and 66 will tend to cause the bistable device to assume first one and then the other of its stable states, but whenever there is a pulse from the gate 31, the bistable device will be caused to assume or remain in a particular one of its stable states. It is believed that the operation of the bistable device will be clearly understood from the previous description. As the details of the operation of such an Eccles-Jordan circuit are well known, it is believed to be unnecessary to describe such details.

The square wave deriving circuit 29 preferably comprises a ringing circuit 67 followed by a squaring amplifier 68. The ringing circuit is driven by the rising edges of signal A (Fig. 3), and its purpose is to discriminate against noise. The sine wave output from the ringing circuit is squared by the squaring amplifier to produce the signal E (Fig. 6).

The gating signal generator 33 comprises a one-shot multivibrator, including tubes 69 and 70 and the associated circuit components and connections, a detector 71, and a drive tube 72. As previously described, the gating signal generator serves to produce the gating pulse F to open the gate 31 for a predetermined time interval. The detector 71 is a frequency-sensitive device which produces a change in D.-C. level upon application of pulses of the correct frequency (50-kc.) from the pulse deriver 24. This detector may comprise a crystal filter followed by a limiter stage, an average detector and a memory detector. The detector 71 produces a positive-going voltage which is differentiated and the resulting pulse used to drive tube 72 and trigger the multivibrator. The latter goes from one state to another to produce the signal F, and then goes back to the first state and remains there. As this is a well known device, detailed description of its operation is unnecessary.

Referring now to the gating circuit 31, this circuit comprises the three tubes 73 to 75 and the associated circuit components and connections as shown. It will be noted that the plates of tubes 73 and 74 are connected together and are connected to a common source of B supply voltage 76 through resistor 77. It will be noted also that the control grid of tube 75 is connected to the plates of tubes 73 and 74, and the plate of tube 75 is connected to the bistable device 28.

The signal E (Fig. 6) from circuit 29 is supplied over conductor 30 to the control grid of tube 74, but in the absence of the gate-opening signal F (Fig. 7) from generator 33, there is no output from the gate 31 for the following reasons. Tube 75 is normally cut off, and remains so in the absence of substantial rise of voltage at the plates of tubes 73 and 74. Tubes 73 and 74 are normally conductive, and due to the voltage drop across resistor 77, the voltage at the plates of tubes 73 and 74 is normally low and is insufficient to raise the control grid of tube 75 above cutoff. In order to do so, tubes 73 and 74 must both be cut off.

Signal E is supplied to the control grid of the tube 74 through a differentiating capacitor 78, and consequently the grid receives alternate positive and negative pulses. The positive pulses have no effect because the tube is conducting. The negative pulses effect cutoff of the tube, but in the absence of signal F at the grid of tube 73, the latter tube remains in full conduction.

When signal F is supplied to the control grid of tube 73 from generator 33, tube 73 is cut off and remains so for the duration of signal F. During the occurrence of signal F, the negative pulses derived from signal E cause repeated cutoff of tube 74, and consequently positive pulses appear at the plates of tubes 73 and 74. These positive pulses cause intermittent conduction of tube 75, and consequently negative pulses appear at point 79 due to the voltage dropping effect of resistor 80. These negative pulses are the pulses of signal G (Fig. 8). Thus it will be seen that the gate 31 effectively delivers the pulses of signal G to the bistable device 28 during the occurrence of the gate-opening signal F.

From the foregoing description, it will be seen that this invention provides a novel system for producing the desired timing signal H of Fig. 9 from the composite signal of Fig. 3. As previously indicated, this timing signal is utilized at the receiving station of a transmitting and receiving system of the character disclosed and claimed in the aforementioned Warnock application.

While a preferred embodiment of this invention has been illustrated and described, it is to be understood that the invention is not limited thereto but contemplates such modifications and other embodiments as may occur to those skilled in the art.

I claim:

1. A system for producing a signal for the decoding of a binary code intelligence signal having alternating wave components of differing phase representative of the binary digits and immediately preceded by an alternating wave synchronizing signal having a frequency corresponding to the rate of occurrence of the binary digits represented in said intelligence signal and having a phase corresponding to the phase of the wave components of the intelligence signal representative of a particular binary digit, said system comprising means for differentiating said signals to produce a train of pulses, there being interruptions of said pulse train at the instants when said intelligence signal changes phase, means for producing from said pulse train an uninterrupted second pulse train, means for producing from said synchronizing signal alone a third pulse train having a pulse recurrence frequency and a phase related to the frequency and the phase of the synchronizing signal, means for producing from said second pulse train a decoding signal having a frequency corresponding to said rate of occurrence of binary digits, and means for establishing from said third pulse train a phase of said decoding signal according to the phase of said synchronizing signal.

2. A system for producing a signal for the decoding of a binary code intelligence signal having alternating wave components of differing phase representative of the binary digits and immediately preceded by an alternating wave synchronizing signal having a frequency corresponding to the rate of occurrence of the binary digits represented in said intelligence signal and having a phase corresponding to the phase of the wave components of the intelligence signal representative of a particular binary digit, said system comprising means for differentiating said signals to produce a first train of pulses having a pulse recurrence frequency equal to twice the aforementioned frequency and rate of occurrence, there being interruptions of said pulse train at the instants when said intelligence signal changes phase, means for producing from said first pulse train an uninterrupted second pulse train, means for producing from said synchronizing signal alone a third pulse train having a pulse recurrence frequency and a phase related to the frequency and the phase of the synchronizing signal, a bistable device for generating a decoding signal, means for supplying said second pulse train to said device to effect operation thereof, and means for applying said third pulse train to said device to establish a phase of the generated decoding signal according to the phase of said synchronizing signal.

3. A system for producing a signal for the decoding of a binary code intelligence signal having alternating wave components of differing phase representative of the binary digits and immediately preceded by an alternating wave synchronizing signal having a frequency corresponding to the rate of occurrence of the binary digits represented in said intelligence signal and having a phase corresponding to the phase of the wave components of the intelligence signal representative of a particular binary digit, said system comprising means for differentiating said signals to produce a train of pulses, there being interruptions of said pulse train at the instants when said intelligence signal changes phase, an oscillator adapted to produce an output wave having the same frequency as the pulse recurrence frequency of said pulse train, means for controlling said oscillator to synchronize the phase of said output wave with the phase of said pulse train, means for deriving from said output wave an uninterrupted second pulse train, means for producing from said synchronizing signal alone a third pulse train having a pulse recurrence frequency and a phase related to the frequency and the phase of the synchronizing signal, means for producing from said second pulse train a decoding signal having a frequency corresponding to said rate of occurrence of binary digits, and means for establishing from said third pulse train a phase of said decoding signal according to the phase of said synchronizing signal.

4. A system for producing a signal for the decoding of a binary code intelligence signal having alternating wave components of differing phase representative of the binary digits and immediately preceded by an alternating wave synchronizing signal having a frequency corresponding to the rate of occurrence of the binary digits represented in said intelligence signal and having a phase corresponding to the phase of the wave components of the intelligence singal representative of a particular binary digit, said system comprising means for differentiating said signals to produce a first train of pulses having a pulse recurrence frequency equal to twice the aforementioned frequency and rate of occurrence, there being interruptions of said pulse train at the instants when said intelligence signal changes phase, an oscillator adapted to produce an output wave having the same frequency as the pulse recurrence frequency of said pulse train, means for controlling said oscillator to synchronize the phase of said output wave with the phase of said pulse train, means for deriving from said output wave an uninterrupted second pulse train, means for producing from said synchronizing signal alone a third pulse train having a pulse recurrence frequency and a phase related to the frequency and the phase of the synchronizing signal, a bistable device for generating a decoding signal, means for supplying said second pulse train to said device to effect operation thereof, and means for applying said third pulse train to said device to establish a phase of the generated decoding signal according to the phase of said synchronizing signal.

5. A system for producing a signal for the decoding of a binary code intelligence signal having alternating wave components of differing phase representative of the binary digits and immediately preceded by an alternating synchronizing signal having a frequency corresponding to the rate of occurrence of the binary digits represented in said intelligence signal and having a phase corresponding to the phase of the wave components of the intelligence signal representative of a particular binary digit, said system comprising means for differentiating said signals to produce a first train of pulses having a pulse recurrence frequency equal to twice the aforementioned frequency and rate of occurrence, there being interruptions of said pulse train at the instants when said intelligence train changes phase, means for producing from said first pulse train an uninterrupted second pulse train, means for producing from said synchronizing train a third pulse train having a pulse recurrence frequency and a phase related to the frequency and the phase of the synchronizing signal, a bistable device for generating a decoding signal, means for supplying said second pulse train to said device to effect operation thereof, a normally closed gate, means for supplying said third pulse train to said gate, means for opening said gate for a predetermined time interval, and means for supplying the output of said gate to said device to establish a phase of said decoding signal according to the phase of said synchronizing signal.

6. Apparatus according to claim 5, wherein the means for opening said gate comprises a gating signal generator operable by said first pulse train to supply a gating signal to the gate.

7. In a system employing an alternating signal wave having a certain frequency and having an initial portion of constant phase and subsequent components of different phases, apparatus for producing from said signal wave a continuous signal having the same frequency and having a constant phase corresponding to the phase of said initial portion, comprising means for producing from said signal wave a train of pulses which inherently has interruptions at the instants when said signal wave changes its phase, means for producing from said pulse train an uninterrupted second pulse train, means for producing from said second pulse train the desired continuous signal whose phase without modification may not correspond to the phase of the initial portion of said signal wave, means for producing from said initial portion a phase-corrective third pulse train, and means for causing said third pulse train to insure that the phase of said desired signal shall correspond to the phase of said initial portion of said signal wave.

8. In a system employing an alternating signal wave having a certain frequency and having an initial portion of constant phase and subsequent components of different phases, apparatus for producing from said signal wave a continuous signal having the same frequency and having a constant phase corresponding to the phase of said initial portion, comprising means for differentiating said signal wave to produce a train of pulses which inherently has interruptions at the instants when said signal wave changes its phase, means for producing from said pulse train an uninterrupted second pulse train, means for producing from said second pulse train the desired continuous signal whose phase without modification may not correspond to the phase of the initial portion of said signal wave, means for producing from said initial portion a phase-corrective third pulse train, and means for causing said third pulse train to insure that the phase of said desired signal shall correspond to the phase of said initial portion of said signal wave.

9. In a system employing an alternating signal wave having a certain frequency and having an initial portion of constant phase and subsequent components of different phases, apparatus for producing from said signal wave a continuous signal having the same frequency and having a constant phase corresponding to the phase of said initial portion, comprising means for differentiating said signal wave to produce a train of pulses which inherently has interruptions at the instants when said signal wave changes its phase, means for producing from said pulse train an uninterrupted second pulse train, a bistable device for generating the desired continuous signal, means for supplying said second pulse train to said device to effect operation thereof, means for producing from the initial portion of said signal wave a phase-corrective third pulse train, and means for applying said third pulse train to said device to insure that the phase of said desired signal shall correspond to the phase of said initial portion of said signal wave.

10. In a system employing an alternating signal wave having a certain frequency and having an initial portion of constant phase and subsequent components of different phases, apparatus for producing from said signal wave a continuous signal having the same frequency and having a constant phase corresponding to the phase of said initial portion, comprising means for differentiating said signal wave to produce a train of pulses which inherently has interruptions at the instants when said signal wave changes its phase, an oscilaltor adapted to produce an output wave having the same frequency as said signal wave, means for controlling said oscillator to synchronize the phase of said output wave with the phase of said pulse train, means for deriving from said output wave an uninterrupted second pulse train, means for producing from said second pulse train the desired continuous signal whose phase without modification may not correspond to the phase of the initial portion of said signal wave, means for producing from said initial portion a phase-corrective third pulse train, and means for causing said third pulse train to insure that the phase of said desired signal shall correspond to the phase of said initial portion of said signal wave.

11. In a system employing an alternating signal wave having a certain frequency and having an initial portion of constant phase and subsequent components of different phases, apparatus for producing from said signal wave a continuous signal having the same frequency and having a constant phase corresponding to the phase of said initial portion, comprising means for differentiating said signal wave to produce a train of pulses which inherently has interruptions at the instants when said signal wave changes its phase, an oscillator adapted to produce an output wave having the same frequency as said signal wave, means for controlling said oscillator to synchronize the phase of said output wave with the phase of said pulse train, means for deriving from said output wave an uninterrupted second pulse train, a bistable device for generating the desired continuous signal, means for supplying said second pulse train to said device to effect operation thereof, means for producing from the initial portion of said signal wave a phase-corrective third pulse train, and means for applying said third pulse train to said device to insure that the phase of said desired signal shall correspond to the phase of said initial portion of said signal wave.

12. In a system employing an alternating signal wave having a certain frequency and having an initial portion of constant phase and subsequent components of different phases, apparatus for producing from said signal wave a continuous signal having the same frequency and having a constant phase corresponding to the phase of said initial portion, comprising means for producing from said signal wave a train of pulses which inherently has interruptions at the instants when said signal wave changes its phase, means for producing from said pulse train an uninterrupted second pulse train, means for producing from said second pulse train the desired continuous signal whose phase without modification may not correspond to the phase of the initial portion of said signal wave, a normally-closed gate, means for supplying to said gate a signal derived directly from said initial portion, means for opening said gate for a predetermined time interval to produce in the output thereof a phase-corrective third pulse train, and means for causing said third pulse train to insure that the phase of said desired signal shall correspond to the phase of said initial portion of said signal wave.

13. Apparatus according to claim 12, wherein the means for opening said gate comprises a gating signal generator operable by said first pulse train to supply a gating signal to the gate.

14. In a system employing an alternating signal wave having a certain frequency and having an initial portion of constant phase and subsequent components of different phases, apparatus for producing from said signal wave a continuous signal having the same frequency and having a constant phase corresponding to the phase of said initial portion, comprising means for differentiating said signal wave to produce a train of pulses which inherently has interruptions at the instants when said signal wave changes its phase, an oscillator adapted to produce an output wave having the same frequency as said signal wave, means for controlling said oscillator to synchronize the phase of said output wave with the phase of said pulse train, means for deriving from said output wave an uninterrupted second pulse train, means for producing from said second pulse train the desired continuous signal whose phase without modification may not correspond to the phase of the initial portion of said signal wave, a normally-closed gate, means for supplying to said gate a signal derived directly from said initial portion, means for opening said gate for a predetermined time interval to produce in the output thereof a phase-corrective third pulse train, and means for causing said third pulse train to insure that the phase of said desired signal shall correspond to the phase of said initial portion of said signal wave.

15. In a system employing an alternating signal wave having a certain frequency and having an initial portion of constant phase and subsequent components of different phases, apparatus for producing from said signal wave a continuous signal having the same frequency and having a constant phase corresponding to the phase of said initial portion, comprising means for producing from said signal wave a train of pulses which inherently has interruptions at the instants when said signal wave changes its phase, means for producing from said pulse signal an uninterrupted second pulse train, a bistable device for generating the desired continuous signal, means for supplying said second pulse train to said device to effect operation thereof, a normally closed gate, means for supplying to said gate a signal derived from the initial portion of said signal wave, means for opening said gate for a predetermined time interval to produce in the output thereof a phase-corrective third pulse train, and means for applying said third pulse train to said device to insure that the phase of said desired signal shall correspond to the phase of said initial portion of said signal wave.

16. In a system employing an alternating signal wave having a certain frequency and having an initial portion of constant phase and subsequent components of different phases, apparatus for producing from said signal wave a continuous signal having the same frequency and having a constant phase corresponding to the phase of said initial portion, comprising means for differentiating said signal wave to produce a train of pulses which inherently has interruptions at the instants when said signal wave changes its phase, an oscillator adapted to produce an output wave having the same frequency as said signal wave, means for controlling said oscillator to synchronize the phase of said output wave with the phase of said pulse train, means for deriving from said output wave an uninterrupted second pulse train, a bistable device for generating the desired continuous signal, means for supplying said second pulse train to said device to effect operation thereof, a normally closed gate, means for supplying to said gate a signal derived directly from the initial portion of said signal wave, means for opening said gate for a predetermined time interval to produce in the output thereof a phase-corrective third pulse train, and means for applying said third pulse train to said device to insure that the phase of said desired signal shall correspond to the phase of said initial portion of said signal wave.

References Cited in the file of this patent

UNITED STATES PATENTS

| | | |
|---|---|---|
| 1,559,642 | Nyquist | Nov. 3, 1925 |
| 2,418,112 | De Rosa | Apr. 1, 1947 |
| 2,435,207 | Dimond | Feb. 3, 1948 |
| 2,471,333 | Leroy | May 24, 1949 |
| 2,564,559 | Canfora | Aug. 14, 1951 |
| 2,676,245 | Doelz | Apr. 20, 1954 |